US010990174B2

(12) United States Patent
Kaifosh et al.

(10) Patent No.: US 10,990,174 B2
(45) Date of Patent: Apr. 27, 2021

(54) METHODS AND APPARATUS FOR PREDICTING MUSCULO-SKELETAL POSITION INFORMATION USING WEARABLE AUTONOMOUS SENSORS

(71) Applicant: Facebook Technologies, LLC, Menlo Park, CA (US)

(72) Inventors: Patrick Kaifosh, New York, NY (US); Timothy Machado, Palo Alto, CA (US); Thomas Reardon, New York, NY (US); Erik Schomburg, Brooklyn, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 134 days.

(21) Appl. No.: 15/659,072

(22) Filed: Jul. 25, 2017

(65) Prior Publication Data

US 2018/0024635 A1 Jan. 25, 2018

Related U.S. Application Data

(60) Provisional application No. 62/366,421, filed on Jul. 25, 2016.

(51) Int. Cl.
   *G06F 3/0487* (2013.01)
   *G06F 3/01* (2006.01)
   *G06F 3/02* (2006.01)

(52) U.S. Cl.
   CPC .............. *G06F 3/015* (2013.01); *G06F 3/017* (2013.01); *G06F 3/02* (2013.01); *G06F 3/0487* (2013.01)

(58) Field of Classification Search
   CPC .......... A61B 5/6824; A61B 5/04–0496; A61B 5/04012–04018; A61B 5/0488–0492;
   (Continued)

(56) References Cited

U.S. PATENT DOCUMENTS

| 1,411,995 A | 4/1922 | Dull |
| 3,580,243 A | 5/1971 | Johnson et al. |

(Continued)

FOREIGN PATENT DOCUMENTS

| CA | 2902045 A1 | 8/2014 |
| CA | 2921954 A1 | 2/2015 |

(Continued)

OTHER PUBLICATIONS

International Search Report and Written Opinion for International Application No. PCT/US2017/043686 dated Oct. 6, 2017.

(Continued)

*Primary Examiner* — Amr A Awad
*Assistant Examiner* — Aaron Midkiff
(74) *Attorney, Agent, or Firm* — FisherBroyles, LLP

(57) ABSTRACT

Methods and apparatus for providing a dynamically-updated computerized musculo-skeletal representation comprising a plurality of rigid body segments connected by joints. The method comprises recording, using a plurality of autonomous sensors arranged on one or more wearable devices, a plurality of autonomous signals from a user, wherein the plurality of autonomous sensors include a plurality of neuromuscular sensors configured to record neuromuscular signals. The method further comprises providing as input to a trained statistical model, the plurality of neuromuscular signals and/or information based on the plurality of neuromuscular signals. The method further comprises determining, based on an output of the trained statistical model, musculo-skeletal position information describing a spatial relationship between two or more connected segments of the plurality of rigid body segments of the computerized musculo-skeletal representation, and updating the computerized musculo-skeletal representation based, at least in part, on the musculo-skeletal position information.

20 Claims, 6 Drawing Sheets

(58) Field of Classification Search
CPC .......... G06F 3/014; G06F 3/015; G06F 1/163; G06F 3/017; G06F 3/02; G06F 3/0487; G06N 20/00–20; G06N 7/00–08; G06N 3/00–3/126
USPC .................................................. 345/156–158
See application file for complete search history.

(56) References Cited

U.S. PATENT DOCUMENTS

| | | |
|---|---|---|
| 3,620,208 A | 11/1971 | Higley |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,482,051 A | 1/1996 | Reddy et al. |
| 5,605,059 A | 2/1997 | Woodward |
| 5,625,577 A | 4/1997 | Kunii et al. |
| 5,683,404 A | 11/1997 | Johnson |
| 6,005,548 A | 12/1999 | Latypov et al. |
| 6,009,210 A | 12/1999 | Kang |
| 6,032,530 A | 3/2000 | Hock |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,491,892 B2 | 2/2009 | Wanger et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| 7,870,211 B2 | 1/2011 | Pascal et al. |
| 7,901,368 B2 | 3/2011 | Flaherty et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,311,623 B2 | 11/2012 | Sanger |
| 8,351,651 B2 | 1/2013 | Lee |
| 8,355,671 B2 | 1/2013 | Kramer et al. |
| 8,389,862 B2 | 4/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| 8,467,270 B2 | 6/2013 | Gossweiler, III et al. |
| 8,469,741 B2 | 6/2013 | Oster et al. |
| 8,484,022 B1 | 7/2013 | Vanhoucke |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,718,980 B2 | 5/2014 | Garudadri et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| 8,912,094 B2 | 12/2014 | Koo et al. |
| 8,922,481 B1 | 12/2014 | Kauffman et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |

(56) References Cited

U.S. PATENT DOCUMENTS

| | | |
|---|---|---|
| D756,359 S | 5/2016 | Bailey et al. |
| 9,351,653 B1 | 5/2016 | Harrison |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,408,316 B2 | 8/2016 | Bailey et al. |
| 9,418,927 B2 | 8/2016 | Axisa et al. |
| 9,439,566 B2 | 9/2016 | Arne et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| 9,483,123 B2 | 11/2016 | Aleem et al. |
| 9,529,434 B2 | 12/2016 | Choi et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,592,001 B2 | 3/2020 | Berenzweig et al. |
| 2002/0032386 A1 | 3/2002 | Snackner et al. |
| 2002/0077534 A1 | 6/2002 | DuRousseau |
| 2002/0094701 A1 | 7/2002 | Biegelsen et al. |
| 2002/0198472 A1 | 12/2002 | Kramer |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0184544 A1 | 10/2003 | Prudent |
| 2004/0054273 A1 | 3/2004 | Finneran et al. |
| 2004/0068409 A1 | 4/2004 | Tanaka et al. |
| 2004/0073104 A1 | 4/2004 | Brun del Re et al. |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2005/0005637 A1 | 1/2005 | Rapport |
| 2005/0012715 A1 | 1/2005 | Ford |
| 2005/0070227 A1 | 3/2005 | Shen et al. |
| 2005/0119701 A1 | 6/2005 | Lauter et al. |
| 2005/0177038 A1 | 8/2005 | Kolpin et al. |
| 2006/0037359 A1 | 2/2006 | Stinespring |
| 2006/0061544 A1 | 3/2006 | Min et al. |
| 2006/0121958 A1 | 6/2006 | Fung et al. |
| 2006/0129057 A1 | 6/2006 | Maekawa et al. |
| 2007/0009151 A1 | 1/2007 | Pittman et al. |
| 2007/0016265 A1 | 1/2007 | Davoodi et al. |
| 2007/0132785 A1 | 6/2007 | Ebersole, Jr. et al. |
| 2007/0172797 A1 | 7/2007 | Hada et al. |
| 2007/0177770 A1 | 8/2007 | Derchak et al. |
| 2007/0256494 A1 | 11/2007 | Nakamura et al. |
| 2007/0285399 A1 | 12/2007 | Lund |
| 2008/0051673 A1 | 2/2008 | Kong et al. |
| 2008/0052643 A1 | 2/2008 | Ike et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0102580 A1 | 4/2009 | Uchaykin |
| 2009/0112080 A1 | 4/2009 | Matthews |
| 2009/0124881 A1 | 5/2009 | Rytky |
| 2009/0189867 A1 | 7/2009 | Krah et al. |
| 2009/0251407 A1 | 10/2009 | Flake et al. |
| 2009/0318785 A1 | 12/2009 | Ishikawa et al. |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0106044 A1 | 4/2010 | Linderman |
| 2010/0113910 A1 | 5/2010 | Brauers et al. |
| 2010/0228487 A1 | 9/2010 | Luethardt et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0315266 A1 | 12/2010 | Gunawardana et al. |
| 2010/0317958 A1 | 12/2010 | Bech et al. |
| 2011/0018754 A1 | 1/2011 | Tojima et al. |
| 2011/0077484 A1 | 3/2011 | Van Slyke et al. |
| 2011/0092826 A1 | 4/2011 | Lee et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0213278 A1 | 9/2011 | Horak et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0313762 A1 | 12/2011 | Ben-David et al. |
| 2012/0029322 A1 | 2/2012 | Wartena et al. |
| 2012/0051005 A1 | 3/2012 | Vanfleteren et al. |
| 2012/0066163 A1 | 3/2012 | Balls et al. |
| 2012/0101357 A1 | 4/2012 | Hoskuldsson et al. |
| 2012/0157789 A1 | 6/2012 | Kangas et al. |
| 2012/0165695 A1 | 6/2012 | Kidmose et al. |
| 2012/0188158 A1 | 7/2012 | Tan et al. |
| 2012/0203076 A1 | 8/2012 | Fatta |
| 2012/0209134 A1 | 8/2012 | Morita et al. |
| 2012/0265090 A1 | 10/2012 | Fink et al. |
| 2012/0265480 A1 | 10/2012 | Oshima |
| 2012/0283526 A1 | 11/2012 | Gommesen et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0004033 A1 | 1/2013 | Trugenberger |
| 2013/0005303 A1 | 1/2013 | Song et al. |

(56) References Cited

U.S. PATENT DOCUMENTS

| | | |
|---|---|---|
| 2013/0020948 A1 | 1/2013 | Han et al. |
| 2013/0027341 A1 | 1/2013 | Mastandrea |
| 2013/0077820 A1 | 3/2013 | Marais et al. |
| 2013/0080794 A1 | 3/2013 | Hsieh |
| 2013/0123656 A1 | 5/2013 | Heck |
| 2013/0127708 A1 | 5/2013 | Jung et al. |
| 2013/0135223 A1 | 5/2013 | Shai |
| 2013/0141375 A1 | 6/2013 | Ludwig et al. |
| 2013/0144629 A1 | 6/2013 | Johnson et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0217998 A1 | 8/2013 | Mahfouz et al. |
| 2013/0232095 A1* | 9/2013 | Tan .................. G06F 3/015 706/12 |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0312256 A1 | 11/2013 | Wesselmann et al. |
| 2013/0317382 A1 | 11/2013 | Le |
| 2013/0317648 A1* | 11/2013 | Assad .................. B25J 9/1694 700/258 |
| 2013/0332196 A1 | 12/2013 | Pinsker |
| 2014/0020945 A1 | 1/2014 | Hurwitz et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0052150 A1 | 2/2014 | Taylor et al. |
| 2014/0121471 A1 | 3/2014 | Walker |
| 2014/0122958 A1 | 3/2014 | Greenebrg et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0107493 A1 | 4/2014 | Yuen et al. |
| 2014/0142937 A1 | 5/2014 | Powledge et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0223462 A1 | 8/2014 | Aimone et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0277622 A1 | 9/2014 | Raniere |
| 2014/0278441 A1 | 9/2014 | Ton et al. |
| 2014/0285326 A1 | 9/2014 | Luna et al. |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0084860 A1 | 3/2015 | Aleem et al. |
| 2015/0094564 A1 | 4/2015 | Tashman et al. |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0261306 A1 | 9/2015 | Lake |
| 2015/0261318 A1 | 9/2015 | Scavezze et al. |
| 2015/0277575 A1 | 10/2015 | Ataee et al. |
| 2015/0296553 A1 | 10/2015 | DiFranco et al. |
| 2015/0302168 A1 | 10/2015 | De Sapio et al. |
| 2015/0309563 A1 | 10/2015 | Connor |
| 2015/0309582 A1 | 10/2015 | Gupta |
| 2015/0312175 A1 | 10/2015 | Langholz |
| 2015/0313496 A1 | 11/2015 | Connor |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0049073 A1 | 2/2016 | Lee |
| 2016/0092504 A1 | 3/2016 | Mitri et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xioli et al. |
| 2016/0170710 A1 | 6/2016 | Kim et al. |
| 2016/0187992 A1 | 6/2016 | Yamamoto et al. |
| 2016/0199699 A1 | 7/2016 | Klassen |
| 2016/0202081 A1 | 7/2016 | Debieuvre et al. |
| 2016/0207201 A1 | 7/2016 | Herr et al. |
| 2016/0235323 A1 | 8/2016 | Tadi et al. |
| 2016/0239080 A1 | 8/2016 | Marcolina et al. |
| 2016/0259407 A1 | 9/2016 | Schick |
| 2016/0262687 A1 | 9/2016 | Imperial |
| 2016/0274758 A1 | 9/2016 | Bailey |
| 2016/0275726 A1 | 9/2016 | Mullins |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0350973 A1 | 12/2016 | Shapira et al. |

(56) References Cited

U.S. PATENT DOCUMENTS

| | | |
|---|---|---|
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068445 A1 | 3/2017 | Lee et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0119472 A1 | 5/2017 | Herrmann et al. |
| 2017/0123487 A1 | 5/2017 | Hazra et al. |
| 2017/0124816 A1 | 5/2017 | Yang et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0259167 A1 | 9/2017 | Cook et al. |
| 2017/0262064 A1 | 9/2017 | Ofir et al. |
| 2017/0285756 A1 | 10/2017 | Wang et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1 | 10/2017 | Ito |
| 2017/0344706 A1 | 11/2017 | Torres et al. |
| 2017/0347908 A1 | 12/2017 | Watanabe et al. |
| 2018/0000367 A1 | 1/2018 | Longinotti-Buitoni |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0081439 A1 | 3/2018 | Daniels |
| 2018/0088765 A1 | 3/2018 | Bailey |
| 2018/0092599 A1 | 4/2018 | Kerth et al. |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0120948 A1 | 5/2018 | Aleem et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1* | 6/2018 | Bouton ................ A61B 5/0488 |
| 2018/0178008 A1 | 6/2018 | Bouton et al. |
| 2018/0240459 A1 | 8/2018 | Weng et al. |
| 2018/0301057 A1 | 10/2018 | Hargrove et al. |
| 2018/0307314 A1 | 10/2018 | Connor |
| 2018/0321745 A1 | 11/2018 | Morun et al. |
| 2018/0321746 A1 | 11/2018 | Morun et al. |
| 2018/0333575 A1 | 11/2018 | Bouton |
| 2018/0344195 A1 | 12/2018 | Morun et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0076716 A1 | 3/2019 | Chiou et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0212817 A1 | 7/2019 | Kaifosh et al. |
| 2019/0223748 A1 | 7/2019 | Al-natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0097081 A1 | 3/2020 | Stone et al. |

FOREIGN PATENT DOCUMENTS

| | | |
|---|---|---|
| CA | 2939644 A1 | 8/2015 |
| CN | 1838933 A | 9/2006 |
| CN | 103777752 A | 5/2014 |
| CN | 105190578 A | 12/2015 |
| CN | 106102504 A | 11/2016 |
| CN | 110300542 A | 10/2019 |
| DE | 44 12 278 A1 | 10/1995 |
| EP | 0 301 790 A2 | 2/1989 |
| EP | 2198521 B1 | 6/2012 |
| EP | 2541763 A1 | 1/2013 |
| EP | 2959394 A1 | 12/2015 |
| EP | 3104737 A1 | 12/2016 |
| EP | 3 487 395 A1 | 5/2019 |
| JP | H05-277080 A | 10/1993 |
| JP | 2005-095561 A | 4/2005 |
| JP | 2009-50679 A | 3/2009 |
| JP | 2010-520561 A | 6/2010 |
| JP | 2016-507851 A | 3/2016 |
| JP | 2017-509386 A | 4/2017 |
| KR | 10-2012-0094870 A | 8/2012 |
| KR | 10-2012-0097997 A | 9/2012 |
| KR | 2015-0123254 A | 11/2015 |
| KR | 2016-0121552 A | 10/2016 |
| KR | 10-2017-0107283 A | 9/2017 |
| KR | 10-1790147 B1 | 10/2017 |
| WO | WO 2008/109248 A2 | 9/2008 |
| WO | WO 2009/042313 A1 | 4/2009 |
| WO | WO 2010/104879 A2 | 9/2010 |
| WO | 2011/070554 A2 | 6/2011 |
| WO | WO 2012/155157 A1 | 11/2012 |
| WO | WO 2014/130871 A1 | 8/2014 |
| WO | WO 2014/186370 A1 | 11/2014 |
| WO | WO 2014/194257 A1 | 12/2014 |
| WO | WO 2014/197443 A1 | 12/2014 |
| WO | WO 2015/027089 A1 | 2/2015 |
| WO | WO 2015/073713 A1 | 5/2015 |
| WO | WO 2015/081113 A1 | 6/2015 |
| WO | WO 2015/123445 A1 | 8/2015 |
| WO | WO 2015/199747 A1 | 12/2015 |
| WO | WO 2016/041088 A1 | 3/2016 |
| WO | WO 2017/062544 A1 | 4/2017 |
| WO | WO 2017/092225 A1 | 6/2017 |
| WO | WO 2017/120669 A1 | 7/2017 |
| WO | WO 2017/172185 A1 | 10/2017 |
| WO | WO 2017/208167 A1 | 12/2017 |
| WO | 2018/022602 A1 | 2/2018 |
| WO | 2019/099758 A1 | 5/2019 |
| WO | 2019/217419 A2 | 11/2019 |
| WO | 2020/047429 A1 | 3/2020 |
| WO | 2020/061440 A1 | 3/2020 |

OTHER PUBLICATIONS

International Preliminary Report on Patentability for International Application No. PCT/US2017/043686 dated Feb. 7, 2019.
International Search Report and Written Opinion for International Application No. PCT/US2017/043791 dated Oct. 5, 2017.
International Preliminary Report on Patentability for International Application No. PCT/US2017/043791 dated Feb. 7, 2019.
International Search Report and Written Opinion for International Application No. PCT/US2017/043792 dated Oct. 5, 2017.
International Preliminary Report on Patentability for International Application No. PCT/US2017/043792 dated Feb. 7, 2019.
International Search Report and Written Opinion for International Application No. PCT/US2018/056768 dated Jan. 15, 2019.
International Search Report and Written Opinion for International Application No. PCT/US2018/061409 dated Mar. 12, 2019.

(56) References Cited

OTHER PUBLICATIONS

Benko et al., Enhancing Input on and Above the Interactive Surface with Muscle Sensing. The ACM International Conference on Interactive Tabletops and Surfaces. ITS '09. 2009:93-100.
Boyali et al., Spectral Collaborative Representation based Classification for hand gestures recognition on electromyography signals. Biomedical Signal Processing and Control. 2016;24:11-18.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.
Ding et al., HMM with improved feature extraction-based feature parameters for identity recognition of gesture command operators by using a sensed Kinect-data stream. Neurocomputing. 2017;262:108-19.
Farina et al., Man/machine interface based on the discharge timings of spinal motor neurons after targeted muscle reinnervation. Nature. Biomedical Engineering. 2017;1:1-12.
Gallina et al., Surface EMG Biofeedback. Surface Electromyography: Physiology, Engineering, and Applications. 2016:485-500.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9):1409-18.
Kim et al., Real-Time Human Pose Estimation and Gesture Recognition from Depth Images Using Superpixels and SVM Classifier. Sensors. 2015;15:12410-27.
Koerner, Design and Characterization of the Exo-Skin Haptic Device: A Novel Tendon Actuated Textile Hand Exoskeleton. 2017. 5 pages.
Li et al., Motor Function Evaluation of Hemiplegic Upper-Extremities Using Data Fusion from Wearable Inertial and Surface EMG Sensors. Sensors. MDPI. 2017;17(582):1-17.
McIntee, A Task Model of Free-Space Movement-Based Geastures. Dissertation. Graduate Faculty of North Carolina State University. Computer Science. 2016. 129 pages.
Naik et al., Source Separation and Identification issues in bio signals: A solution using Blind source seperation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13:1-17.
Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Saponas et al., Making Muscle-Computer Interfaces More Practical. CHI 2010: Brauns and Brawn. 2010:851-4.
Sauras-Perez et al., A Voice and Pointing Gesture Interaction System for Supporting Human Spontaneous Decisions in Autonomous Cars. Clemson University. All Dissertations. 2017. 174 pages.
Shen et al., I am a Smartwatch and I can Track my User's Arm. University of Illinois at Urbana-Champaign. MobiSys' 16. 12 pages.
Son et al., Evaluating the utility of two gestural discomfort evaluation methods. PLOS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Wodzinski et al., Sequential Classification of Palm Gestures Based on a* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358):1-14.
International Search Report and Written Opinion for International Application No. PCT/US2017/043693 dated Oct. 6, 2017.
International Preliminary Report on Patentability for International Application No. PCT/US2017/043693 dated Feb. 7, 2019.
International Search Report and Written Opinion for International Application No. PCT/US2019/015180 dated May 28, 2019.
International Search Report and Written Opinion for International Application No. PCT/US2019/028299 dated Aug. 9, 2019.
Invitation to Pay Additional Fees for International Application No. PCT/US2019/031114 dated Aug. 6, 2019.
Gopura et al., A Human Forearm and wrist motion assist exoskeleton robot with EMG-based fuzzy-neuro control. Proceedings of the 2nd IEEE/RAS-EMBS International Conference on Biomedial Robotics and Biomechatronics. Oct. 19-22, 2008. 6 pages.
Valero-Cuevas et al., Computational Models for Neuromuscular Function. NIH Public Access Author Manuscript. Jun. 16, 2011. 52 pages.
Yang et al., Surface EMG based handgrip force predictions using gene expression programming. Neurocomputing. 2016;207:568-579.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 16, 2019.
International Search Report and Written Opinion for International Application No. PCT/US2019/015244 dated May 16, 2019.
International Search Report and Written Opinion for International Application No. PCT/US19/20065 dated May 16, 2019.
Arkenbout et al., Robust Hand Motion Tracking through Data Fusion of 5DT Data Glove and Nimble VR Kinect Camera Measurements. Sensors. 2015;15:31644-71.
Davoodi et al., Development of a Physics-Based Target Shooting Game to Train Amputee Users of Multijoint Upper Limb Protheses. Presence. Massachusetts Institute of Technology. 2012;21(1):85-95.
Favorskaya et al., Localization and Recognition of Dynamic Hand Gestures Based on Hierarchy of Manifold Classifiers. International Archives of the Photogrammetry, Remote Sensing and Spatial Information Sciences. 2015;XL-5/W6:1-8.
Hauschild et al., A Virtual Reality Environment for Designing and Fitting Neural Prosthetic Limbs. IEEE Transactions on Neural Systems and Rehabilitation Engineering. 2007;15(1):9-15.
Lee et al., Motion and Force Estimation System of Human Fingers. Journal of Institute of Control, Robotics and Systems. 2011;17(10):1014-1020.
Lopes et al., Hand/arm gesture segmentation by motion using IMU and EMG sensing. ScienceDirect. Elsevier. Procedia Manufacturing. 2017;11:107-13.

(56) References Cited

OTHER PUBLICATIONS

Martin et al., A Novel Approach of Prosthetic Arm Control using Computer Vision, Biosignals, and Motion Capture. IEEE. 2014. 5 pages.

Mendes et al., Sensor Fusion and Smart Sensor in Sports and Biomedical Applications. Sensors. 2016;16(1569):1-31.

Sartori et al., Neural Data-Driven Musculoskeletal Modeling for Personalized Neurorehabilitation Technologies. IEEE Transactions on Biomedical Engineering. 2016;63(5):879-93.

Costanza et al., "EMG as a Subtle Input Interface for Mobile Computing", Mobile HCI 2004, LNCS 3160, edited by S. Brewster and M. Dunlop, Springer-Verlag Berlin Heidelberg, pp. 426-430, 2004.

Costanza et al., "Toward Subtle Intimate Interfaces for Mobile Devices Using an EMG Controller", CHI 2005, Proceedings of the SIGCHI Conference on Human Factors in Computing Systems, pp. 481-489, 2005.

Ghasemzadeh et al., "A Body Sensor Network With Electromyogram and Inertial Sensors: Multimodal Interpretation of Muscular Activities", IEEE Transactions on Information Technology in Biomedicine, vol. 14, No. 2, pp. 198-206, Mar. 2010.

Gourmelon et al., "Contactless sensors for Surface Electromyography", Proceedings of the 28th IEEE EMBS Annual International Conference, New York City, NY, Aug. 30-Sep. 3, 2006, pp. 2514-2517.

International Search Report and Written Opinion, dated May 16, 2014, for corresponding International Application No. PCT/US2014/017799, 9 pages.

International Search Report and Written Opinion, dated Aug. 21, 2014, for corresponding International Application No. PCT/US2014/037863, 10 pages.

International Search Report and Written Opinion, dated Nov. 21, 2014, for corresponding International Application No. PCT/US2014/052143, 9 pages.

International Search Report and Written Opinion, dated Feb. 27, 2015, for corresponding International Application No. PCT/US2014/067443, 10 pages.

International Search Report and Written Opinion, dated May 27, 2015, for corresponding International Application No. PCT/US2015/015675, 9 pages.

Morris et al., "Emerging Input Technologies for Always-Available Mobile Interaction", Foundations and Trends in Human-Computer Interaction 4(4):245-316, 2010. (74 total pages).

Naik et al., "Real-Time Hand Gesture Identification for Human Computer Interaction Based on ICA of Surface Electromyogram", IADIS International Conference Interfaces and Human Computer Interaction, 2007, 8 pages.

Picard et al., "Affective Wearables", Proceedings of the IEEE 1st International Symposium on Wearable Computers, ISWC, Cambridge, MA, USA, Oct. 13-14, 1997, pp. 90-97.

Rekimoto, "Gesture Wrist and GesturePad: Unobtrusive Wearable Interaction Devices", ISWC '01 Proceedings of the 5th IEEE International Symposium on Wearable Computers, 2001, 7 pages.

Extended European Search Report received for EP Patent Application Serial No. 17835112.8 dated Feb. 5, 2020, 17 pages.

Sato et al., "Touche: Enhancing Touch Interaction on Humans, Screens, Liquids, and Everyday Objects", CHI' 12, May 5-10, 2012, Austin, Texas.

Ueno et al., "A Capacitive Sensor System for Measuring Laplacian Electromyogram through Cloth: A Pilot Study", Proceedings of the 29th Annual International Conference of the IEEE EMBS, Cite Internationale, Lyon, France, Aug. 23-26, 2007.

Ueno et al., "Feasibility of Capacitive Sensing of Surface Electromyographic Potential through Cloth", Sensors and Materials 24(6):335-346, 2012.

Xiong et al., "A Novel HCI based on EMG and IMU", Proceedings of the 2011 IEEE International Conference on Robotics and Biomimetics, Phuket, Thailand, Dec. 7-11, 2011, 5 pages.

Zhang et al., "A Framework for Hand Gesture Recognition Based on Accelerometer and EMG Sensors", IEEE Transactions on Systems, Man, and Cybernetics—Part A: Systems and Humans, vol. 41, No. 6, pp. 1064-1076, Nov. 2011.

Non-Final Office Action received for U.S. Appl. No. 14/505,836 dated Jun. 30, 2016, 37 pages.

Xu et al., "Hand Gesture Recognition and Virtual Game Control Based on 3D Accelerometer and EMG Sensors", Proceedings of the 14th international conference on Intelligent user interfaces, Sanibel Island, Florida, Feb. 8-11, 2009, pp. 401-406.

Communication pursuant to Rule 164(1) EPC, dated Sep. 30, 2016, for corresponding EP Application No. 14753949.8, 7 pages.

Non-Final Office Action received for U.S. Appl. No. 14/505,836 dated Feb. 23, 2017, 54 pages.

Brownlee, "Finite State Machines (FSM): Finite state machines as a control technique in Artificial Intelligence (AI)", Jun. 2002, 12 pages.

Final Office Action received for U.S. Appl. No. 14/505,836 dated Jul. 28, 2017, 52 pages.

Final Office Action received for U.S. Appl. No. 16/353,998 dated Nov. 29, 2019, 33 pages.

Non-Final Office Action received for U.S. Appl. No. 16/557,342 dated Oct. 22, 2019, 16 pages.

International Preliminary Report on Patentability received for PCT Application Serial No. PCT/US2014/017799 dated Sep. 3, 2015, 8 pages.

International Preliminary Report on Patentability received for PCT Application Serial No. PCT/US2014/037863 dated Nov. 26, 2015, 8 pages.

International Preliminary Report on Patentability received for PCT Application Serial No. PCT/US2014/052143 dated Mar. 3, 2016, 7 pages.

International Preliminary Report on Patentability received for PCT Application Serial No. PCT/US2014/067443 dated Jun. 9, 2016, 7 pages.

International Preliminary Report on Patentability received for PCT Application Serial No. PCT/US2015/015675 dated Aug. 25, 2016, 8 pages.

International Search Report and Written Opinion received for PCT Application Serial No. PCT/US2019/049094 dated Jan. 9, 2020, 27 pages.

Corazza et al., "A Markerless Motion Capture System to Study Musculoskeletal Biomechanics: Visual Hull and Simulated Annealing Approach", Annals of Biomedical Engineering, vol. 34, No. 6, Jul. 2006, pp. 1019-1029.

Non-Final Office Action received for U.S. Appl. No. 15/882,858 dated Oct. 30, 2019, 22 pages.

Non-Final Office Action received for U.S. Appl. No. 16/353,998 dated May 24, 2019, 20 pages.

Final Office Action received for U.S. Appl. No. 16/557,342 dated Jan. 28, 2020, 15 pages.

Non-Final Office Action received for U.S. Appl. No. 16/557,383 dated Dec. 23, 2019, 53 pages.

Non-Final Office Action received for U.S. Appl. No. 16/557,427 dated Dec. 23, 2019, 52 pages.

Non-Final Office Action received for U.S. Appl. No. 15/816,435 dated Jan. 22, 2020, 35 pages.

Non-Final Office Action received for U.S. Appl. No. 16/577,207 dated Nov. 19, 2019, 32 pages.

Final Office Action received for U.S. Appl. No. 16/577,207 dated Feb. 4, 2020, 76 pages.

Non-Final Office Action received for U.S. Appl. No. 15/974,430 dated May 16, 2019, 12 pages.

Final Office Action received for U.S. Appl. No. 15/974,430 dated Dec. 11, 2019, 30 pages.

Non-Final Office Action received for U.S. Appl. No. 15/974,384 dated May 16, 2019, 13 pages.

Notice of Allowance received for U.S. Appl. No. 15/974,384 dated Nov. 4, 2019, 39 pages.

Berenzweig et al., "Wearable Devices and Methods for Improved Speech Recognition", U.S. Appl. No. 16/785,680, filed Feb. 10, 2020, 67 pages.

(56) References Cited

OTHER PUBLICATIONS

Non-Final Office Action received for U.S. Appl. No. 15/974,454 dated Dec. 20, 2019, 41 pages.
Final Office Action received for U.S. Appl. No. 15/974,454 dated Apr. 9, 2020, 19 pages.
International Search Report and Written Opinion received for PCT Application Serial No. PCT/US2019/031114 dated Dec. 20, 2019, 18 pages.
Extended European Search Report for European Application No. EP 17835111.0 dated Nov. 21, 2019.
Extended European Search Report for European Application No. EP 17835140.9 dated Nov. 26, 2019.
International Search Report and Written Opinion for International Application No. PCT/US2019/037302 dated Oct. 11, 2019.
International Search Report and Written Opinion for International Application No. PCT/US2019/034173 dated Sep. 18, 2019.
International Search Report and Written Opinion for International Application No. PCT/US2019/042579 dated Oct. 31, 2019.
Invitation to Pay Additional Fees for International Application No. PCT/US2019/049094 mailed Oct. 24, 2019.
International Search Report and Written Opinion for International Application No. PCT/US2019/052131 dated Dec. 6, 2019.
International Search Report and Written Opinion for International Application No. PCT/US2019/046351 dated Nov. 7, 2019.
Al-Mashhadany, Inverse Kinematics Problem (IKP) of 6-DOF Manipulator Bgy Locally Recurrent Neural Networks (LRNNs). Management and Service Science (MASS). 2010 International Conference on, IEEE. Aug. 24, 2010. 5 pages. ISBN: 978-1-4244-5325-2.
Kipke et al., Silicon-substrate Intracortical Microelectrode Arrays for Long-Term Recording of Neuronal Spike Activity in Cerebral Cortex. IEEE Transactions on Neural Systems and Rehabilitation Engineering. 2003;11(2):151-155.
Marcard et al., Sparse Inertial Poser: Automatic 3D Human Pose Estimation from Sparse IMUs. Eurographics. 2017;36(2). 12 pages.
Mohamed, Homogeneous cognitive based biometrics for static authentication. Dissertation submitted to University of Victoria, Canada. 2010. 149 pages. URL:http://hdl.handle.net/1828/3211 [last accessed Oct. 11, 2019].
Wittevrongel et al., Spatiotemporal Beamforming: A Transparent and Unified Decoding Approach to Synchronous Visual Brain-Computer Interfacing. Frontiers in Neuroscience. 2017;11:1-12.
Zacharaki et al., Spike pattern recognition by supervised classification in low dimensional embedding space. Brain Informatics. 2016;3:73-8. DOI: 10.1007/s40708-016-0044-4.
Non-Final Office Action received for U.S. Appl. No. 15/882,858 dated Sep. 2, 2020, 66 pages.
Non-Final Office Action received for U.S. Appl. No. 15/974,454 dated Aug. 20, 2020, 59 pages.
Notice of Allowance received for U.S. Appl. No. 16/557,427 dated Aug. 19, 2020, 22 pages.
Final Office Action received for U.S. Appl. No. 15/882,858 dated Jun. 2, 2020, 127 pages.
Non-Final Office Action received for U.S. Appl. No. 16/353,998 dated May 26, 2020, 60 pages.
Non-Final Office Action received for U.S. Appl. No. 15/974,430 dated Apr. 30, 2020, 57 pages.
Final Office Action received for U.S. Appl. No. 16/557,383 dated Jun. 2, 2020, 66 pages.
Final Office Action received for U.S. Appl. No. 16/557,427 dated Jun. 5, 2020, 95 pages.
Preinterview First Office Action received for U.S. Appl. No. 16/785,680 dated Jun. 24, 2020, 90 pages.
Non-Final Office Action received for U.S. Appl. No. 16/557,342 dated Jun. 15, 2020, 46 pages.
PCT/US2019/028299, dated Aug. 9, 2019, International Search Report and Written Opinion.
PCT/US2019/031114, dated Aug. 6, 2019, Invitation to Pay Additional Fees.

EP 17835111.0, dated Nov. 21, 2019, Extended European Search Report.
EP 17835140.9, dated Nov. 26, 2019, Extended European Search Report.
PCT/US2019/034173, dated Sep. 18, 2019, International Search Report and Written Opinion.
PCT/US2019/037302, dated Oct. 11, 2019, International Search Report and Written Opinion.
PCT/US2019/042579, dated Oct. 31, 2019, International Search Report and Written Opinion.
PCT/US2019/046351, dated Nov. 7, 2019, International Search Report and Written Opinion.
PCT/US2019/049094, dated Oct. 24, 2019, Invitation to Pay Additional Fees.
PCT/US2019/052131, dated Dec. 6, 2019, International Search Report and Written Opinion.
PCT/US2017/043686, dated Oct. 6, 2017, International Search Report and Written Opinion.
PCT/US2017/043686, dated Feb. 7, 2019, International Preliminary Report on Patentability.
PCT/US2017/043791, dated Oct. 5, 2017, International Search Report and Written Opinion.
PCT/US2017/043791, dated Feb. 7, 2019, International Preliminary Report on Patentability.
PCT/US2017/043792, dated Oct. 5, 2017, International Search Report and Written Opinion.
PCT/US2017/043792, dated Feb. 7, 2019, International Preliminary Report on Patentability.
PCT/US2018/056768, dated Jan. 15, 2019, International Search Report and Written Opinion.
PCT/US2018/061409, dated Mar. 12, 2019, International Search Report and Written Opinion.
U.S. Appl. No. 14/505,836, filed Oct. 3, 2014.
U.S. Appl. No. 15/974,430, filed May 8, 2018.
U.S. Appl. No. 15/816,435, filed Nov. 17, 2017.
U.S. Appl. No. 15/882,858, filed Jan. 29, 2018.
U.S. Appl. No. 16/353,998, filed Mar. 14, 2019.
U.S. Appl. No. 16/557,342, filed Aug. 30, 2019.
U.S. Appl. No. 16/557,383, filed Aug. 30, 2019.
U.S. Appl. No. 16/557,427, filed Aug. 30, 2019.
U.S. Appl. No. 16/577,207, filed Sep. 20, 2019.
PCT/US2018/063215, dated Mar. 21, 2019, International Search Report and Written Opinion.
PCT/US2019/015134, dated May 15, 2019, International Search Report and Written Opinion.
PCT/US2019/015167, dated May 21, 2019, International Search Report and Written Opinion.
PCT/US2019/015174, dated May 21, 2019, International Search Report and Written Opinion.
PCT/US2019/015238, dated May 16, 2019, International Search Report and Written Opinion.
PCT/US2019/015183, dated May 3, 2019, International Search Report and Written Opinion.
PCT/US2019/015180, dated May 28, 2019, International Search Report and Written Opinion.
PCT/US2019/015244, dated May 16, 2019, International Search Report and Written Opinion.
PCT/US19/20065, dated May 16, 2019, International Search Report and Written Opinion.
PCT/US2017/043693, dated Oct. 6, 2017, International Search Report and Written Opinion.
PCT/US2017/043693, dated Feb. 7, 2019, International Preliminary Report on Patentability.
Final Office Action received for U.S. Appl. No. 15/974,430 dated Nov. 3, 2020, 27 pages.
Notice of Allowance received for U.S. Appl. No. 15/974,454 dated Nov. 2, 2020, 24 pages.
Final Office Action received for U.S. Appl. No. 16/577,207 dated Jan. 13, 2021, 91 pages.
Partial Supplementary Search Report received for EP Patent Application Serial No. 18879156.0 dated Dec. 7, 2020, 10 pages.

(56) References Cited

OTHER PUBLICATIONS

Communication Pursuant to Article 94(3) EPC received for EP Patent Application Serial No. 17835112.8 dated Dec. 14, 2020, 6 pages.

* cited by examiner

US 10,990,174 B2

METHODS AND APPARATUS FOR PREDICTING MUSCULO-SKELETAL POSITION INFORMATION USING WEARABLE AUTONOMOUS SENSORS

CROSS-REFERENCE TO RELATED APPLICATIONS

This application claims the benefit under 35 U.S.C. § 119(e) of U.S. Provisional Patent Application Ser. No. 62/366,421, filed Jul. 25, 2016, and entitled "Virtual Musculo-Skeletal Representation Using Wearable Sensors," the entire contents of which is incorporated by reference herein.

BACKGROUND

In some computer applications that generate musculo-skeletal representations of the human body, it is desirable for the application to know the spatial positioning, orientation and movement of a user's body to provide a realistic representation of body movement. For example, in a virtual reality (VR) environment, tracking the spatial position of the user's hand enables the application to represent the hand motion in the VR environment, which allows the user to interact with (e.g., by grasping or manipulating) virtual objects within the VR environment. Some existing techniques for tracking movements using wearable sensors include using information obtained from multiple Inertial Measurement Units (IMUs) affixed to different parts of the user's body, and using external imaging devices (e.g., fixed-position cameras) to reconstruct the position and orientation of parts of the user's body.

SUMMARY

Some embodiments are directed to predicting information about the positioning and movements of portions of a user's body represented as a multi-segment articulated rigid body system (e.g., a user's arm, hand, leg, etc.) in an autonomous manner, i.e., without requiring external sensors, such as cameras, lasers, or global positioning systems (GPS). Signals recorded by wearable autonomous sensors placed at locations on the user's body are provided as input to a statistical model trained to predict musculo-skeletal position information, such as joint angles between rigid segments of an articulated multi-segment rigid body model of the human body. As a result of the training, the statistical model implicitly represents the statistics of motion of the articulated rigid body under defined movement constraints. The output of the trained statistical model may be used to generate a computer-based musculo-skeletal representation of at least a portion of the user's body, which in turn can be used for applications such as rendering a representation of the user's body in a virtual environment, interaction with physical or virtual objects, and monitoring a user's movements as the user performs a physical activity to assess, for example, whether the user is providing the physical activity in a desired manner.

Some embodiments are directed to a system configured to aggregate measurements from a plurality of autonomous sensors placed at locations on a user's body. The aggregate measurements may be used to create a unified representation of muscle recruitment by superimposing the measurements onto a dynamically-posed skeleton. In some embodiments, muscle activity sensed by neuromuscular sensors and/or information derived from the muscle activity (e.g., force information) may be combined with the computer-generated musculo-skeletal representation in real time.

Some embodiments are directed to a computerized system for providing a dynamically-updated computerized musculo-skeletal representation comprising a plurality of rigid body segments connected by joints. The system comprises a plurality of autonomous sensors including a plurality of neuromuscular sensors, wherein the plurality of autonomous sensors are arranged on one or more wearable devices, wherein the plurality of neuromuscular sensors are configured to continuously record a plurality of neuromuscular signals from a user and at least one computer processor. The at least one computer processor is programmed to provide as input to a trained statistical model, the plurality of neuromuscular signals and/or information based on the plurality of neuromusuclar signals, determine, based on an output of the trained statistical model, musculo-skeletal position information describing a spatial relationship between two or more connected segments of the plurality of rigid body segments of the computerized musculo-skeletal representation, and update the computerized musculo-skeletal representation based, at least in part, on the musculo-skeletal position information.

Other embodiments are directed to a method of providing a dynamically-updated computerized musculo-skeletal representation comprising a plurality of rigid body segments connected by joints. The method comprises recording, using a plurality of autonomous sensors arranged on one or more wearable devices, a plurality of autonomous signals from a user, wherein the plurality of autonomous sensors comprise a plurality of neuromuscular sensors configured to record a plurality of neuromuscular signals, providing as input to a trained statistical model, the plurality of neuromuscular signals and/or information based on the plurality of neuromuscular signals, determining, based on an output of the trained statistical model, musculo-skeletal position information describing a spatial relationship between two or more connected segments of the plurality of rigid body segments of the computerized musculo-skeletal representation, and updating the computerized musculo-skeletal representation based, at least in part, on the musculo-skeletal position information.

Other embodiments are directed to a computer-readable storage medium encoded with a plurality of instructions that, when executed by at least one computer processor, perform a method. The method comprises recording, using a plurality of autonomous sensors arranged on one or more wearable devices, a plurality of autonomous signals from a user, wherein the plurality of autonomous sensors comprise a plurality of neuromuscular sensors configured to record a plurality of neuromuscular signals, providing as input to a trained statistical model, the plurality of neuromuscular signals and/or information based on the plurality of neuromuscular signals, determining, based on an output of the trained statistical model, musculo-skeletal position information describing a spatial relationship between two or more connected segments of the plurality of rigid body segments of the computerized musculo-skeletal representation, and updating the computerized musculo-skeletal representation based, at least in part, on the musculo-skeletal position information.

Other embodiments are directed to a computer system for training a statistical model to predict musculo-skeletal position information based, at least in part, on autonomous signals recorded by a plurality of autonomous sensors, wherein the plurality of autonomous sensors include a plurality of neuromuscular sensors configured to record a plurality of neuromuscular signals. The computer system comprises an input interface configured to receive the neuromuscular signals recorded during performance of a task performed by one or more users, receive position information indicating a position of a plurality of rigid body segments of a computerized musculo-skeletal representation during performance of the task performed by the one or more users; and at least one storage device configured to store a plurality of instructions that, when executed by at least one computer processor perform a method. The method comprises generating training data based, at least on part, on the received neuromuscular signals and the received position information, training the statistical model using at least some of the generated training data to output a trained statistical model, and storing, by the at least one storage device, the trained statistical model, wherein the trained statistical model is configured to predict musculo-skeletal position information based, at least in part on continuously recorded signals from the neuromuscular sensors.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

DETAILED DESCRIPTION

The human musculo-skeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model the human musculo-skeletal system. However, it should be appreciated that some segments of the human musculo-skeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the arm may be modeled as a two-segment articulated rigid body with an upper portion corresponding to the upper arm connected at a shoulder joint to the torso of the body and a lower portion corresponding to the forearm, wherein the two segments are connected at the elbow joint. As another example, the hand may be modeled as a multi-segment articulated body with the joints in the wrist and each finger forming the interfaces between the multiple segments in the model. In some embodiments, movements of the segments in the rigid body model can be simulated as an articulated rigid body system in which orientation and position information of a segment relative to other segments in the model are predicted using a trained statistical model, as described in more detail below.

Figure 1:
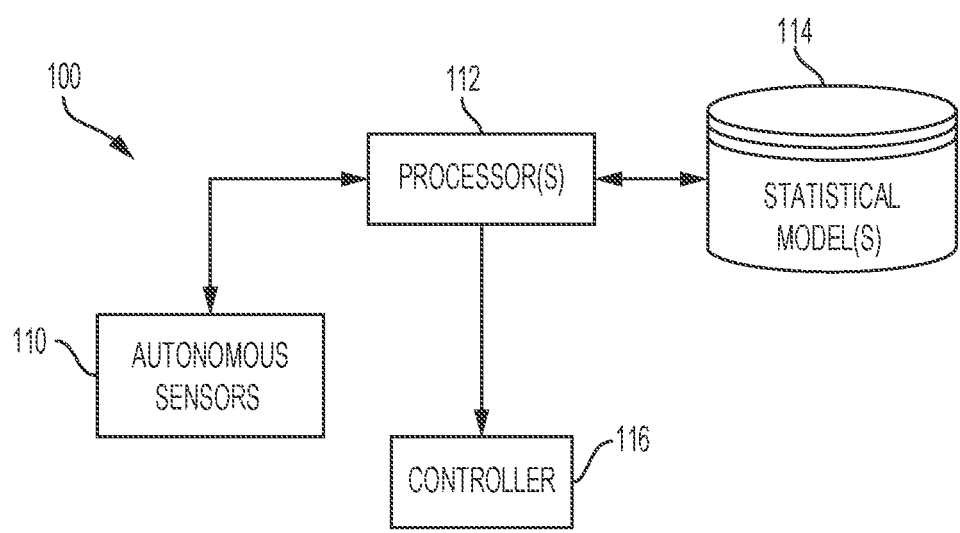
FIG. 1 is a schematic diagram of a computer-based system for predicting musculo-skeletal position information in accordance with some embodiments of the technology described herein.

FIG. 1 illustrates a system 100 in accordance with some embodiments. The system includes a plurality of autonomous sensors 110 configured to record signals resulting from the movement of portions of a human body. As used herein, the term "autonomous sensors" refers to sensors configured to measure the movement of body segments without requiring the use of external sensors, examples of which include, but are not limited to, cameras or global positioning systems. Autonomous sensors 110 may include one or more Inertial Measurement Units (IMUs), which measure a combination of physical aspects of motion, using, for example, an accelerometer and a gyroscope. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso (e.g., arms, legs) as the user moves over time.

Autonomous sensors 110 may also include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) describing the movement (e.g., for portions of the user's body distal to the user's torso, such as hands and feet) may be predicted based on the sensed neuromuscular signals as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso, whereas the neuromuscular sensors may be arranged to detect movements of one or more body segments distal to the torso. It should be appreciated, however, that autonomous sensors 110 may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of autonomous sensors 110 include one or more movement sensing components configured to sense movement information. In the case of IMUs, the movement sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the movement sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the movement sensing components may be processed using hardware signal processing circuitry (e.g., to perform amplification, filtering, and/or rectification). In other embodiments, at least some signal processing of the output of the movement sensing components may be performed in software. Thus, signal processing of autonomous signals recorded by autonomous sensors 110 may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors 110 may implement signal processing using components integrated with the movement sensing components, or at least a portion of the signal processing may be performed by one or more components in communication with, but not directly integrated with the movement sensing components of the autonomous sensors.

In some embodiments, at least some of the plurality of autonomous sensors 110 are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body.

Figure 2:
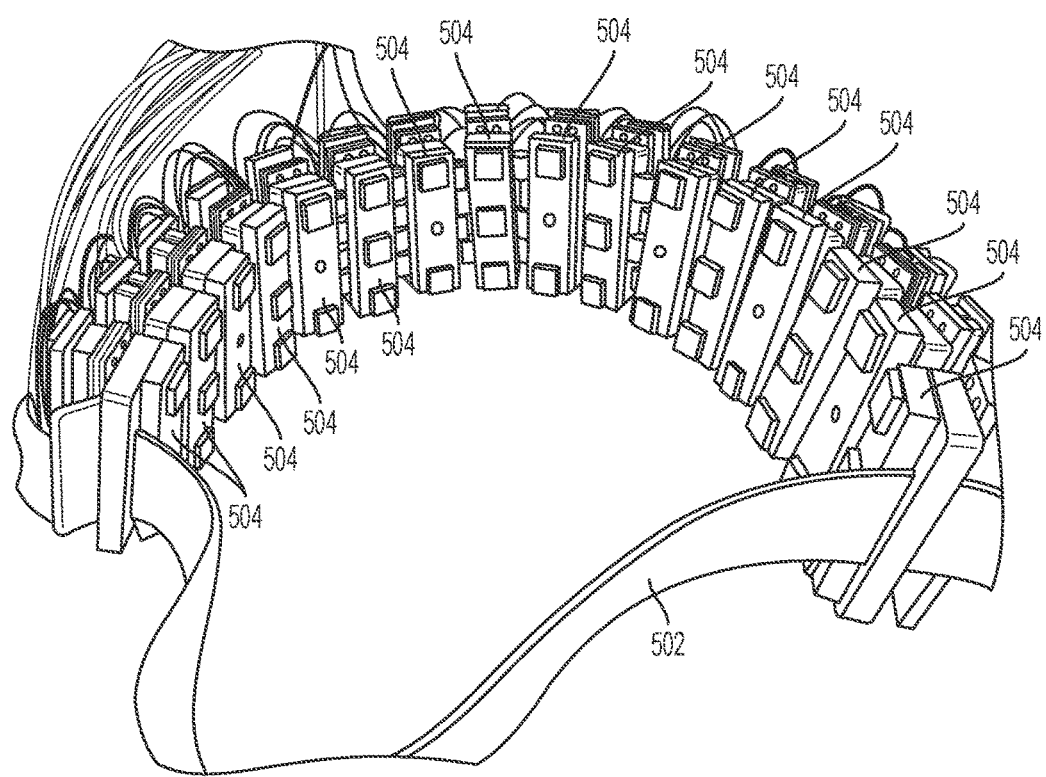
FIG. 2 illustrates a wristband having EMG sensors arranged circumferentially thereon, in accordance with some embodiments of the technology described herein.
Figure 3:
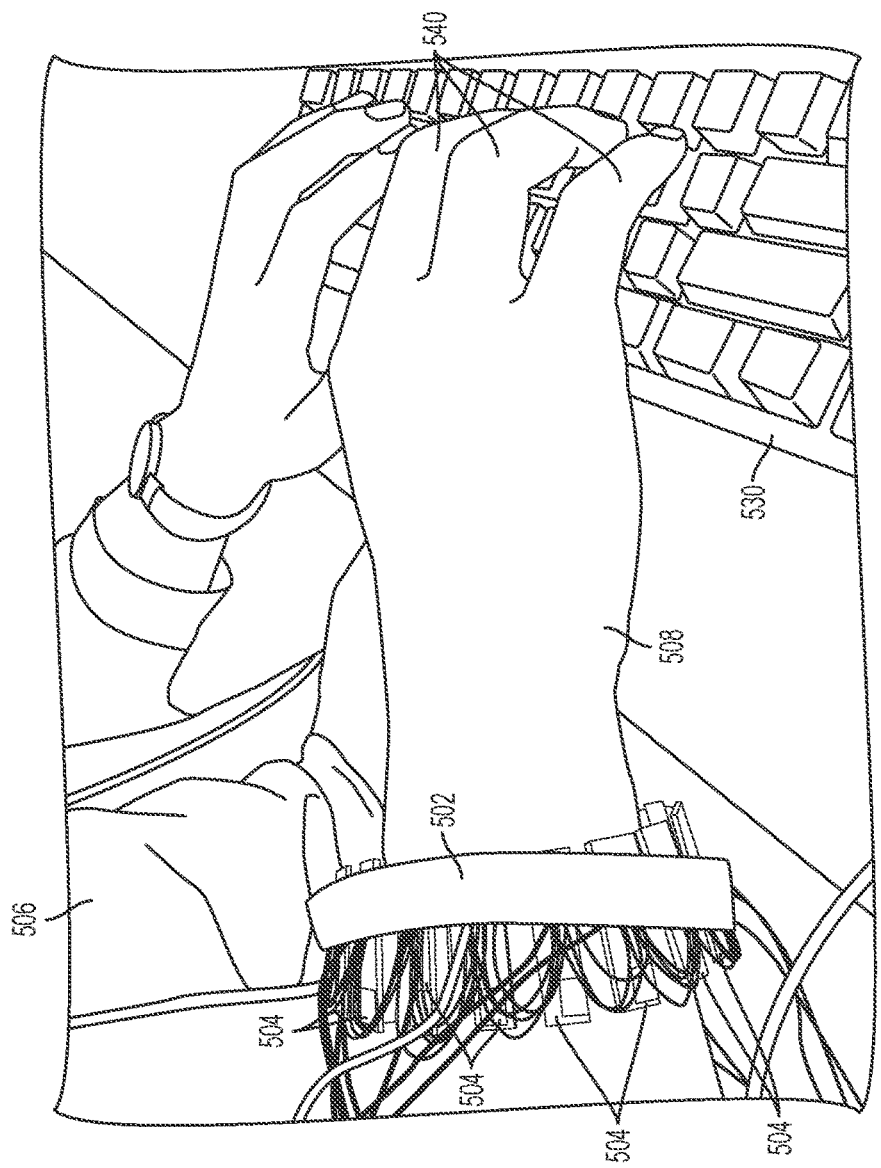
FIG. 3 illustrates a user wearing the wristband of FIG. 2 while typing on a keyboard, in accordance with some embodiments of the technology described herein.

In one implementation, 16 EMG sensors are arranged circumferentially around an elastic band configured to be worn around a user's lower arm. For example, FIG. 2 shows EMG sensors 504 arranged circumferentially around elastic band 502. It should be appreciated that any suitable number of neuromuscular sensors may be used and the number and arrangement of neuromuscular sensors used may depend on the particular application for which the wearable device is used. For example, a wearable armband or wristband may be used to predict musculo-skeletal position information for hand-based motor tasks such as manipulating a virtual or physical object, whereas a wearable leg or ankle band may be used to predict musculo-skeletal position information for foot-based motor tasks such as kicking a virtual or physical ball. For example, as shown in FIG. 3, a user 506 may be wearing elastic band 502 on hand 508. In this way, EMG sensors 504 may be configured to record EMG signals as a user controls keyboard 530 using fingers 540. In some embodiments, elastic band 502 may also include one or more IMUs (not shown), configured to record movement information, as discussed above.

In some embodiments, multiple wearable devices, each having one or more IMUs and/or neuromuscular sensors included thereon may be used to predict musculo-skeletal position information for movements that involve multiple parts of the body.

System 100 also includes one or more computer processors 112 programmed to communicate with autonomous sensors 110. For example, signals recorded by one or more of the autonomous sensors 110 may be provided to processor(s) 112, which may be programmed to perform signal processing, non-limiting examples of which are described above. Processor(s) 112 may be implemented in hardware, firmware, software, or any combination thereof. Additionally, processor(s) 112 may be co-located on a same wearable device as one or more of the autonomous sensors or may be at least partially located remotely (e.g., processing may occur on one or more network-connected processors).

System 100 also includes datastore 114 in communication with processor(s) 112. Datastore 114 may include one or more storage devices configured to store information describing a statistical model used for predicting musculoskeletal position information based on signals recorded by autonomous sensors 110 in accordance with some embodiments. Processor(s) 112 may be configured to execute one or more machine learning algorithms that process signals output by the autonomous sensors 110 to train a statistical model stored in datastore 114, and the trained (or retrained) statistical model may be stored in datastore 114 for later use in generating a musculo-skeletal representation. Non-limiting examples of statistical models that may be used in accordance with some embodiments to predict musculo-skeletal position information based on recorded signals from autonomous sensors are discussed in more detail below.

In some embodiments, processor(s) 112 may be configured to communicate with one or more of autonomous sensors 110, for example to calibrate the sensors prior to measurement of movement information. For example, a wearable device may be positioned in different orientations on or around a part of a user's body and calibration may be performed to determine the orientation of the wearable device and/or to perform any other suitable calibration tasks. Calibration of autonomous sensors 110 may be performed in any suitable way, and embodiments are not limited in this respect. For example, in some embodiments, a user may be instructed to perform a particular sequence of movements and the recorded movement information may be matched to a template by virtually rotating and/or scaling the signals detected by the sensors (e.g., by the electrodes on EMG sensors). In some embodiments, calibration may involve changing the gain(s) of one or more analog to digital converters (ADCs), for example, in the case that the signals detected by the sensors result in saturation of the ADCs.

System 100 also includes one or more controllers 116 configured receive a control signal based, at least in part, on processing by processor(s) 112. As discussed in more detail below, processor(s) 112 may implement one or more trained statistical models 114 configured to predict musculo-skeletal position information based, at least in part, on signals recorded by autonomous sensors 110 worn by a user. One or more control signals determined based on the output of the trained statistical model(s) may be sent to controller 116 to control one or more operations of a device associated with the controller. In some embodiments, controller 116 comprises a display controller configured to instruct a visual display to display a graphical representation of a computer-based musculo-skeletal representation (e.g., a graphical representation of the user's body or a graphical representation of a character (e.g., an avatar in a virtual reality environment)) based on the predicted musculo-skeletal information. For example, a computer application configured to simulate a virtual reality environment may be instructed to display a graphical representation of the user's body orientation, positioning and/or movement within the virtual reality environment based on the output of the trained statistical model(s). The positioning and orientation of different parts of the displayed graphical representation may be continuously updated as signals are recorded by the autonomous sensors 110 and processed by processor(s) 112 using the trained statistical model(s) 114 to provide a computer-generated representation of the user's movement that is dynamically updated in real-time. In other embodiments, controller 116 comprises a controller of a physical device, such as a robot. Control signals sent to the controller may be interpreted by the controller to operate one or more components of the robot to move in a manner that corresponds to the movements of the user as sensed using the autonomous sensors 110.

Controller 116 may be configured to control one or more physical or virtual devices, and embodiments of the technology described herein are not limited in this respect. Non-limiting examples of physical devices that may be controlled via controller 116 include consumer electronics devices (e.g., television, smartphone, computer, laptop, telephone, video camera, photo camera, video game system, appliance, etc.), vehicles (e.g., car, marine vessel, manned aircraft, unmanned aircraft, farm machinery, etc.), robots, weapons, or any other device that may receive control signals via controller 116.

In yet further embodiments, system 100 may not include one or more controllers configured to control a device. In such embodiments, data output as a result of processing by processor(s) 112 (e.g., using trained statistical model(s) 114) may be stored for future use (e.g., for analysis of a health condition of a user or performance analysis of an activity the user is performing).

In some embodiments, during real-time movement tracking, information sensed from a single armband/wristband wearable device that includes at least one IMU and a plurality of neuromuscular sensors is used to reconstruct body movements, such as reconstructing the position and orientation of both the forearm, upper arm, wrist and hand relative to a torso reference frame using a single arm/wrist-worn device, and without the use of external devices or position determining systems. For brevity, determining both position and orientation may also be referred to herein generally as determining movement.

As discussed above, some embodiments are directed to using a statistical model for predicting musculo-skeletal information based on signals recorded from wearable autonomous sensors. The statistical model may be used to predict the musculo-skeletal position information without having to place sensors on each segment of the rigid body that is to be represented in a computer-generated musculo-skeletal representation of user's body. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model though training based on recorded sensor data. Constraints imposed in the construction of the statistical model are those set by anatomy and the physics of a user's body, while constraints derived from statistical patterns are those set by human behavior for one or more users from which sensor measurements are measured. As described in more detail below, the constraints may comprise part of the statistical model itself being represented by information (e.g., connection weights between nodes) in the model.

In some embodiments, system 100 may be trained to predict musculo-skeletal information as a user moves. In some embodiments, the system 100 may be trained by recording signals from autonomous sensors 110 (e.g., IMU sensors, EMG sensors) and position information recorded from position sensors worn by one or more users as the user(s) perform one or more movements. The position sensors, described in more detail below, may measure the position of each of a plurality of spatial locations on the user's body as the one or more movements are performed during training to determine the actual position of the body segments. After such training, the system 100 may be configured to predict, based on a particular user's autonomous sensor signals, musculo-skeletal position information (e.g., a set of joint angles) that enable the generation of a musculo-skeletal representation without the use of the position sensors.

In some embodiments, after system 100 is trained to predict, based on a particular user's autonomous sensor signals, the musculo-skeletal position information, a user may utilize the system 100 to perform a virtual or physical action without using position sensors. For example, when the system 100 is trained to predict with high accuracy (e.g., at least a threshold accuracy), the musculo-skeletal position information, the predictions themselves may be used to determine the musculo-skeletal position information used to generate a musculo-skeletal representation of the user's body.

As discussed above, some embodiments are directed to using a statistical model for predicting musculo-skeletal position information to enable the generation of a computer-based musculo-skeletal representation. The statistical model may be used to predict the musculo-skeletal position information based on IMU signals, neuromuscular signals (e.g., EMG, MMG, and SMG signals), or a combination of IMU signals and neuromuscular signals detected as a user performs one or more movements.

Figure 4:
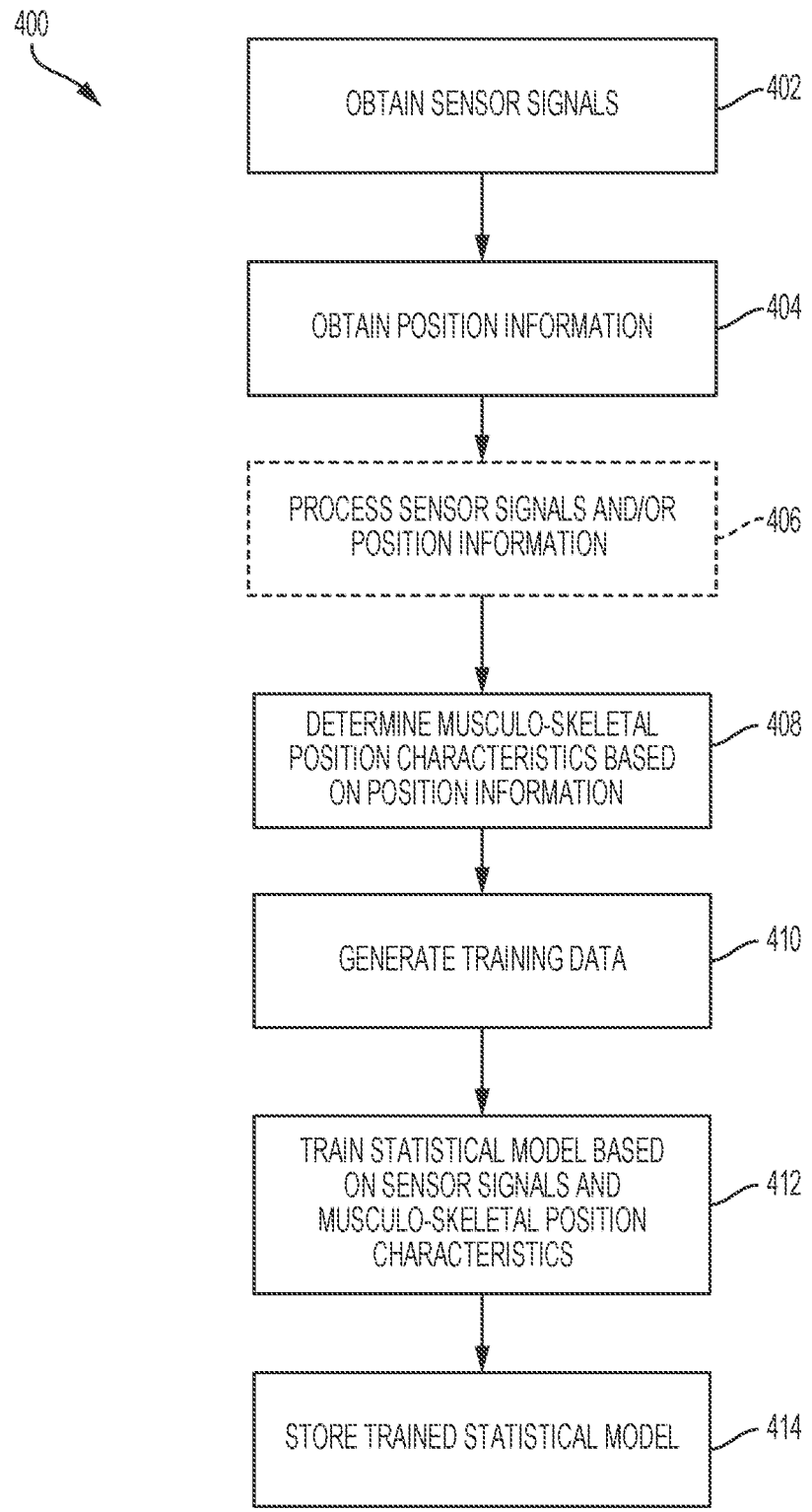
FIG. 4 is a flowchart of an illustrative process for generating a statistical model for predicting musculo-skeletal position information using signals recorded from autonomous sensors, in accordance with some embodiments of the technology described herein.

FIG. 4 describes a process 400 for generating (sometimes termed "training" herein) a statistical model using signals recorded from autonomous sensors worn by one or more users. Process 400 may be executed by any suitable computing device(s), as aspects of the technology described herein are not limited in this respect. For example, process 400 may be executed by processors 112 described with reference to FIG. 1. As another example, one or more acts of process 400 may be executed using one or more servers (e.g., servers included as a part of a cloud computing environment). For example, at least a portion of act 410 relating to training of a statistical model (e.g., a neural network) may be performed using a cloud computing environment.

Process 400 begins at act 402, where a plurality of sensor signals are obtained for one or multiple users performing one or more movements (e.g., typing on a keyboard). In some embodiments, the plurality of sensor signals may be recorded as part of process 400. In other embodiments, the plurality of sensor signals may have been recorded prior to the performance of process 400 and are accessed (rather than recorded) at act 402.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of autonomous sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in act 402 correspond to signals from one type of autonomous sensor (e.g., one or more IMU sensors or one or more neuromuscular sensors) and a statistical model may be trained based on the sensor signals recorded using the particular type of autonomous sensor, resulting in a sensor-type specific trained statistical model. For example, the obtained sensor signals may comprise a plurality of EMG sensor signals arranged around the lower arm or wrist of a user and the statistical model may be trained to predict musculo-skeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors), a separate statistical model may be trained for each of the types of sensors and the outputs of the sensor-type specific models may be combined to generate a musculo-skeletal representation of the user's body. In other embodiments, the sensor signals obtained in act 402 from two or more different types of sensors may be provided to a single statistical model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to a statistical model, as discussed in more detail below.

In some embodiments, the sensor signals obtained in act 402 are recorded at multiple time points as a user performs one or multiple movements. As a result, the recorded signal for each sensor may include data obtained at each of multiple time points. Assuming that n autonomous sensors are arranged to simultaneously measure the user's movement information during performance of a task, the recorded sensor signals for the user may comprise a time series of K n-dimensional vectors $\{x_k | 1 \leq k \leq K\}$ at time points $t_1$, $t_2, \ldots, t_K$ during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate a statistical model, an assumption is that different users employ similar musculo-skeletal positions to perform the same movements. Collecting sensor signals and position information from a single user performing the same task repeatedly and/or from multiple users performing the same task one or multiple times facilitates the collection of sufficient training data to generate a statistical model that can accurately predict musculo-skeletal position information associated with performance of the task.

In some embodiments, a user-independent statistical model may be generated based on training data corresponding to the recorded signals from multiple users, and as the system is used by a user, the statistical model is trained based on recorded sensor data such that the statistical model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing a statistical model for predicting musculo-skeletal position information associated with multiple different actions that may be taken by the user. For example, training data that incorporates musculo-skeletal position information for multiple actions may facilitate generating a statistical model for predicting which of multiple possible movements a user may be performing.

As discussed above, the sensor data obtained at act 402 may be obtained by recording sensor signals as each of one or multiple users performs each of one or more tasks one or more multiple times. As the user(s) perform the task(s), position information describing the spatial position of different body segments during performance of the task(s) may be obtained in act 404. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 402 may be recorded simultaneously with recording of the position information obtained in act 404. In this example, position information indicating the position of each finger segment over time as the grasping motion is performed is obtained.

Next, process 400 proceeds to act 406, where the autonomous sensor signals obtained in act 402 and/or the position information obtained in act 404 are optionally processed. For example, the autonomous sensor signals or the position information signals may be processed using amplification, filtering, rectification, or other types of signal processing.

Next, process 400 proceeds to act 408, where musculo-skeletal position characteristics are determined based on the position information (as collected in act 404 or as processed in act 406). In some embodiments, rather than using recorded spatial (e.g., x, y, z) coordinates corresponding to the position sensors as training data to train the statistical model, a set of derived musculo-skeletal positon characteristic values are determined based on the recorded position information, and the derived values are used as training data for training the statistical model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 404 may be represented by a vector of n joint angles at each of a plurality of time points, where n is the number of joints or connections between segments in the articulated rigid body model.

Next, process 400 proceeds to act 410, where the time series information obtained at acts 402 and 408 is combined to create training data used for training a statistical model at act 410. The obtained data may be combined in any suitable way. In some embodiments, each of the autonomous sensor signals obtained at act 402 may be associated with a task or movement within a task corresponding to the musculo-skeletal position characteristics (e.g., joint angles) determined based on the positional information recorded in act 404 as the user performed the task or movement. In this way, the sensor signals may be associated with musculo-skeletal position characteristics (e.g., joint angles) and the statistical model may be trained to predict that the musculo-skeletal representation will be characterized by particular musculo-skeletal position characteristics between different body segments when particular sensor signals are recorded during performance of a particular task.

In embodiments comprising autonomous sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 400 proceeds to act 412, where a statistical model for predicting musculo-skeletal position information is trained using the training data generated at act 410. The statistical model being trained may take as input a sequence of data sets each of the data sets in the sequence comprising an n-dimensional vector of autonomous sensor data. The statistical model may provide output that indicates, for each of one or more tasks or movements that may be performed by a user, the likelihood that the musculo-skeletal representation of the user's body will be characterized by a set of musculo-skeletal position characteristics (e.g., a set of joint angles between segments in an articulated multi-segment body model). For example, the statistical model may take as input a sequence of vectors $\{x_k | 1 \leq k \leq K\}$ generated using measurements obtained at time points $t_1, t_2, t_K$, where the ith component of vector $x_j$ is a value measured by the ith autonomous sensor at time $t_3$ and/or derived from the value measured by the ith autonomous sensor at time $t_3$. Based on such input, the statistical model may provide output indicating, a probability that a musculo-skeletal representation of the user's body will be characterized by a set of musculoskeletal position characteristics. As one non-limiting example, the statistical model may be trained to predict a set of joint angles for segments in the fingers in the hand over time as a user grasps an object. In this example, the trained statistical model may output, a set of predicted joint angles for joints in the hand corresponding to the sensor input.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model is a neural network, the output layer of the neural network may provide a set of output values corresponding to a respective set of possible musculo-skeletal position characteristics (e.g., joint angles). In this way, the neural network may operate as a non-linear regression model configured to predict musculo-skeletal position characteristics from raw or pre-processed sensor measurements. It should be appreciated that, in some embodiments, any other suitable non-linear regression model may be used instead of a neural network, as aspects of the technology described herein are not limited in this respect.

It should be appreciated that aspects of the technology described herein are not limited to using neural networks, as other types of statistical models may be employed in some embodiments. For example, in some embodiments, the statistical model may comprise a hidden Markov model, a Markov switching model with the switching allowing for toggling among different dynamic systems, dynamic Bayesian networks, and/or any other suitable graphical model having a temporal component. Any such statistical model may be trained at act 412 using the sensor data obtained at act 402.

As another example, in some embodiments, the statistical model may take as input, features derived from the sensor data obtained at act 402. In such embodiments, the statistical model may be trained at act 412 using features extracted from the sensor data obtained at act 402. The statistical model may be a support vector machine, a Gaussian mixture model, a regression based classifier, a decision tree classifier, a Bayesian classifier, and/or any other suitable classifier, as aspects of the technology described herein are not limited in this respect. Input features to be provided as training data to the statistical model may be derived from the sensor data obtained at act 402 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model.

In some embodiments, at act 412, values for parameters of the statistical model may be estimated from the training data generated at act 410. For example, when the statistical model is a neural network, parameters of the neural network (e.g., weights) may be estimated from the training data. In some embodiments, parameters of the statistical model may be estimated using gradient descent, stochastic gradient descent, and/or any other suitable iterative optimization technique. In embodiments where the statistical model is a recurrent neural network (e.g., an LSTM), the statistical model may be trained using stochastic gradient descent and backpropagation through time. The training may employ a cross-entropy loss function and/or any other suitable loss function, as aspects of the technology described herein are not limited in this respect.

Next, process 400 proceeds to act 414, where the trained statistical model is stored (e.g., in datastore 114). The trained statistical model may be stored using any suitable format, as aspects of the technology described herein are not limited in this respect. In this way, the statistical model generated during execution of process 400 may be used at a later time, for example, in accordance with the process described with reference to FIG. 5.

Figure 5:
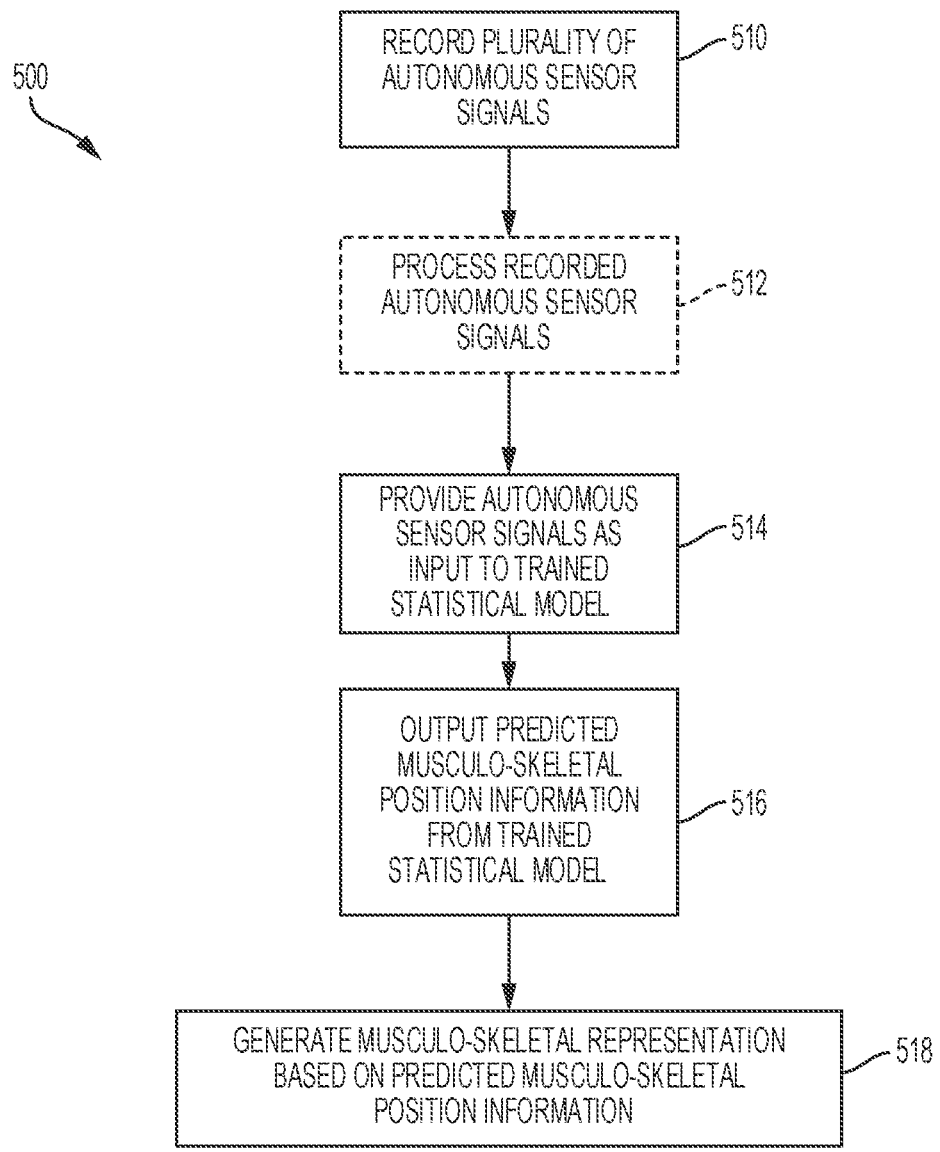
FIG. 5 is a flowchart of an illustrative process for using a trained statistical model to predict musculo-skeletal position information, in accordance with some embodiments of the technology described herein.

FIG. 5 illustrates a process 500 for predicting musculoskeletal position information based on recorded signals from a plurality of autonomous sensors and a trained statistical model in accordance with some embodiments. Although process 500 is described herein with respect to IMU and EMG signals, it should be appreciated that process 500 may be used to predict musculo-skeletal position information based on any recorded autonomous signals including, but not limited to, IMU signals, EMG signals, MMG signals, SMG signals, or any suitable combination thereof and a trained statistical model trained on such autonomous signals.

Process 500 begins in act 510, where signals are recorded from a plurality of autonomous sensors arranged on or near the surface of a user's body to record activity associated with movements of the body during performance of a task. In one example described above, the autonomous sensors comprise an IMU sensor and a plurality of EMG sensors arranged circumferentially (or otherwise oriented) on a wearable device configured to be worn on or around a part of the user's body, such as the user's arm. In some embodiments, the plurality of EMG signals are recorded continuously as a user wears the wearable device including the plurality of autonomous sensors. Process 500 then proceeds to act 512, where the signals recorded by the autonomous sensors are optionally processed. For example, the signals may be processed using amplification, filtering, rectification, or other types of signal processing. In some embodiments, filtering includes temporal filtering implemented using convolution operations and/or equivalent operations in the frequency domain (e.g., after the application of a discrete Fourier transform). In some embodiments, the signals are processed in the same or similar manner as the signals recorded in act 402 of process 400 described above and used as training data to train the statistical model.

Process 500 then proceeds to act 514, where the autonomous sensor signals are provided as input to a statistical model (e.g., a neural network) trained using one or more of the techniques described above in connection with process 400. In some embodiments that continuously record autonomous signals, the continuously recorded autonomous signals (raw or processed) may be continuously or periodically provided as input to the trained statistical model for prediction of musculo-skeletal position information (e.g., joint angles) for the given set of input sensor data. As discussed above, in some embodiments, the trained statistical model is a user-independent model trained based on autonomous sensor and position information measurements from a plurality of users. In other embodiments, the trained model is a user-dependent model trained on data recorded from the individual user from which the data recorded in act 510 is also acquired.

After the trained statistical model receives the sensor data as a set of input parameters, process 500 proceeds to act 516, where predicted musculo-skeletal position information is output from the trained statistical model. As discussed above, in some embodiments, the predicted musculo-skeletal position information may comprise a set of musculo-skeletal position information values (e.g., a set of joint angles) for a multi-segment articulated rigid body model representing at least a portion of the user's body. In other embodiments, the musculo-skeletal position information may comprises a set of probabilities that the user is performing one or more movements from a set of possible movements.

After musculo-skeletal position information is predicted in act 516, process 500 proceeds to act 518, where a computer-based musculo-skeletal representation of the user's body is generated based, at least in part, on the musculo-skeletal position information output from the trained statistical model. The computer-based musculo-skeletal representation may be generated in any suitable way. For example, a computer-based musculo-skeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculo-skeletal model may define the orientation of each of the connected rigid body segments relative to each other and a reference frame, such as the torso of the body. As new sensor data is measured and processed by the statistical model to provide new predictions of the musculo-skeletal position information (e.g., an updated set of joint angles), the computer-based musculo-skeletal representation of the user's body may be updated based on the updated set of joint angles determined based on the output of the statistical model. In this way the computer-based musculo-skeletal representation is dynamically updated in real-time as autonomous sensor data is continuously recorded.

The computer-based musculo-skeletal representation may be represented and stored in any suitable way, as embodiments of the technology described herein are not limited with regard to the particular manner in which the representation is stored. Additionally, although referred to herein as a "musculo-skeletal" representation, to reflect that muscle activity may be associated with the representation in some embodiments, as discussed in more detail below, it should be appreciated that some musculo-skeletal representations used in accordance with some embodiments may correspond to skeletal structures, muscular structures or a combination of skeletal structures and muscular structures in the body.

As discussed above, in some embodiments, one or more control signals may be sent to a controller based on the musculo-skeletal representation generated in act 518 of process 500. For example, when the controller is a display controller, the control signal(s) may instruct a display in communication with the display controller to display a graphical rendering based on the generated muscular-skeletal representation. For a computer application that provides a virtual reality environment, the graphical rendering may be a rendering of the user's body or another computer-generated character (e.g., an avatar) based on a current state of the musculo-skeletal representation. As sensor data is collected, the rendered character may be dynamically updated to provide an animation of the rendered character that mimics the movements of the user wearing the wearable device including the autonomous sensors. In a virtual reality environment, a result of the character's animation may be the ability of the animated character to interact with objects in the virtual reality environment, examples of which include, but are not limited to, grasping a virtual object.

In embodiments, in which the controller is configured to control a physical device (e.g., a robot), the control signal(s) sent to the controller may instruct the physical device to perform one or more actions corresponding to the generated musculo-skeletal representation. For example, when the device being controlled is a robot, the control signal(s) may instruct the controller of the robot to mimic the movements of the user or otherwise control an operation of the robot based on the generated musculo-skeletal representation.

In yet further embodiments, the generated musculo-skeletal representation may be used to track the user's movements over time and provide a control signal to a controller that provides feedback to the user about the tracked movements. For example, the generated and dynamically updated musculo-skeletal representation may track the position of the user's hands as the user is typing on a keyboard and provide feedback to the user when it is determined that the user is likely to experience muscle fatigue due to the position of their hands as they type. Recordings of muscle activity when used in combination with the generated musculo-skeletal representation, as discussed in more detail below with regard to FIG. 6, may be used to track muscle performance (e.g., fatigue, activation) during performance of various tasks and feedback may be provided to instruct the user performance of the task may be improved using different musculo-skeletal positioning as the task is performed. The feedback may be provided in any suitable way using, for example, haptic feedback, audio feedback, and/or visual feedback as embodiments of the technology described herein are not limited based on how the feedback is provided.

In some embodiments at least some of the sensor data recorded during use of the system may be used as training data to train the statistical model to enable the model to continue to refine the statistical relationships between movement-based information recorded by the autonomous sensors and musculo-skeletal position information output by the statistical model. Continuous training of the statistical model may result in improved performance of the model in predicting musculo-skeletal positioning information for movements that are performed by the user in a consistent manner.

Although process 500 is described herein as being performed after process 400 has completed and a statistical model has been trained, in some embodiments, process 400 and 500 may be performed together. For example, the statistical model may be trained in real-time, as a user is performing movements to interact with a virtual or physical object, and the trained statistical model may be used as soon as the model has been trained sufficiently to provide reliable predictions. In some embodiments, this may be performed using a variational autoencoder.

In the embodiments described above, a times series of movement data recorded by autonomous sensors such as IMUs and neuromuscular sensors (EMG) is used to predict musculo-skeletal position information (e.g., a set of joint angles) that describe how the orientation of different segments of a computer-based musculo-skeletal representation change over time based on the user's movements. In this way, the neuromuscular activity recorded by neuromuscular sensors, which indirectly measures body motion through the activation of skeletal muscles, may nonetheless be used to predict how a user is moving through the use of trained statistical model that learns statistical relationships between the recorded neuromuscular signals and the user's movements.

The inventors have recognized and appreciated that in addition to being useful for predicting musculo-skeletal position information, as discussed above, the neuromuscular activity directly recorded by the neuromuscular sensors may be combined with the generated musculo-skeletal representation to provide a richer musculo-skeletal representation that represents additional biophysical underpinnings involved in the user's movements compared to embodiments where only musculo-skeletal positioning/orientation over time is represented. This dual use of the neuromuscular signals recorded by neuromuscular sensors on a wearable device—to directly measure neuromuscular activity and to indirectly predict musculo-skeletal position information, enables some embodiments to control virtual or physical devices in a manner that more closely resembles the movements of the user. For example, some embodiments are configured to use the neuromuscular activity information recorded by the neuromuscular sensors to modify the control signals used to control a virtual or physical device. As a non-limiting example, for an application that provides a virtual reality environment, the dynamically updated computer-based musculo-skeletal representation may track the movements of a user to grasp a virtual egg located within the virtual environment allowing a computer-generated character (e.g., an avatar) associated with the user to hold the virtual egg in its hand. As the user clenches their hand into a fist without substantially moving the spatial position of the their fingers, corresponding detected neuromuscular signals may be used to modify the control signals sent to the application such that rather than just holding the egg, the computer-generated character squeezes the egg with force and breaks the egg. For example, a force value may be derived based on the detected muscle activity sensed by the neuromuscular sensor, and the derived force value may be used to modify the control signals sent to the application. In this way, neuromuscular activity directly recorded by the EMG sensors and/or derived measurements based on the directly recorded EMG sensor data may be used to augment the generated musculo-skeletal representation predicted in accordance with some embodiments of the technology described herein. Further applications of combining neuromuscular activity and musculo-skeletal representations are discussed below in connection with FIG. 6.

Figure 6:
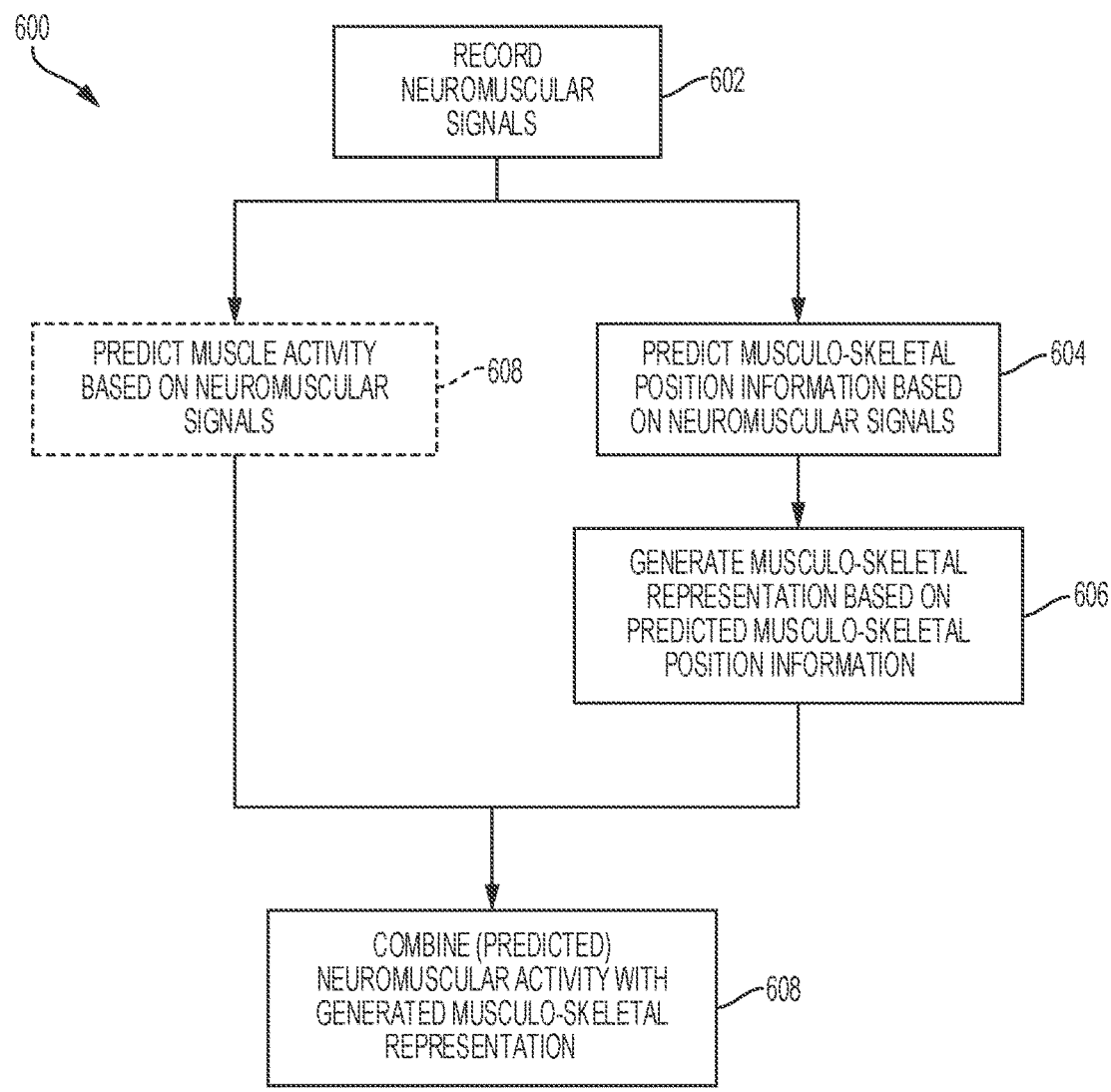
FIG. 6 is a flowchart of an illustrative process for combining neuromuscular signals with predicted musculo-skeletal position information in accordance with some embodiments of the technology described herein.

FIG. 6 illustrates a process 600 for combining neuromuscular activity recorded with neuromuscular sensors with a musculo-skeletal representation generated, at least in part, from the neuromuscular activity, in accordance with some embodiments. In act 602, neuromuscular signals are recorded from a plurality of neuromuscular sensors arranged near or on the surface of a user's body. In some embodiments, examples of which are described above, the plurality of neuromuscular sensors are integrated with a wearable device such as a flexible or adjustable band that may be worn around a portion of a user's body.

The process 600 then proceeds to act 604, where musculo-skeletal position information is predicted based, at least in part, on the recorded neuromuscular signals or signals derived from the neuromuscular signals. For example, as discussed above in connection with process 500, the recorded neuromuscular signals recorded by the neuromuscular signals may be processed using amplification, filtering, rectification, or any other suitable signal processing technique and the processed neuromuscular signals may be provided as input to a statistical model trained to output musculo-skeletal position information predicted based on the input provided to the statistical model. In some embodiments, examples of which are described above, IMU signals recorded by one or more IMU sensors are also provided as input to the trained statistical model and the predicted musculo-skeletal position information output from the trained statistical model is based on both the IMU signals and the neuromuscular signals provided as input.

The process 600 then proceeds to act 606, where a computer-based musculo-skeletal representation is generated based on the predicted musculo-skeletal position information output from the trained statistical model. The processes of predicting musculo-skeletal position information using a trained statistical model and generating a musculo-skeletal representation based on predicted musculo-skeletal position information in accordance with some embodiments is described above in connection with process 500 and is not repeated, for brevity. As should be appreciated from the foregoing, in acts 604 and 606 of process 600, recorded neuromuscular activity is used in combination with a trained statistical model as an indirect way to estimate the movements of portions of a user's body without requiring the use of external sensors, such as cameras or global positioning systems.

The inventors have recognized that the neuromuscular signals, which provide a direct measurement of neuromuscular activity underlying the user's movements may be combined with a generated musculo-skeletal representation to provide an enriched musculo-skeletal representation. Accordingly, process 600 proceeds to act 608, where the neuromuscular activity and/or muscle activity predicted from the recorded neuromuscular activity are combined with the generated musculo-skeletal representation.

The neuromuscular activity may be combined with the generated musculo-skeletal representation in any suitable way. For example, as discussed above, in some embodiments, the control signal(s) sent to a controller for interacting with a physical or virtual object may be modified based, at least in part, on the neuromuscular signals. In some embodiments, modifying the control signal(s) may be implemented by sending one or more additional control signals to the controller and/or by modifying one or more of the control signals generated based on the generated musculo-skeletal representation. In an application that provides a virtual reality environment, one or more characteristics of the neuromuscular signals may be used to determine how a character within the virtual reality environment interacts with objects in the virtual environment. In other embodiments, a visual representation of the neuromuscular activity may be displayed in combination with the character within the virtual reality environment. For example, muscle fatigue due to prolonged contraction of particular muscles and as sensed by the neuromuscular sensors may be shown on the rendering of the character in the virtual reality environment.

Other visual representations of the neuromuscular activity may also be used, and embodiments of the technology described herein are not limited in this respect.

In yet other embodiments, feedback may be provided to the user based on a combination of the neuromuscular activity recorded by the neuromuscular sensors and the generated musculo-skeletal representation. For example, a system in accordance with some embodiments may track both the movements of a portion of the user's body as predicted using the generated musculo-skeletal representation and muscle activity that results in the movements to instruct the user about the proper way to perform a particular task. Applications in which such tracking of combined movement and muscle activity may be useful includes, but is not limited to, tracking performance of athletes to provide feedback on muscle engagement to reduce muscle fatigue, facilitating physical rehabilitation by providing instructional feedback to injured patients, and providing instructional feedback to users to teach desired ways of performing tasks that proactively prevent injuries.

As shown in FIG. 6, process 600 includes an optional act 608 of using the neuromuscular signals to predict muscle activity. The inventors have recognized and appreciated that recorded neuromuscular signals precede the performance of the corresponding motor movements by hundreds of milliseconds. Accordingly, the neuromuscular signals themselves may be used to predict the onset of movement prior the movement being performed. Examples of using a trained statistical model to predict the onset of a movement are described in the co-pending patent application entitled, "Methods and Apparatus for Inferring User Intention," filed on the same day as the instant application, the entire contents of which is incorporated herein by reference. Accordingly, in some embodiments, muscle activity predicted based, at least in part, on the recorded neuromuscular signals in act 608 is combined with the generated musculo-skeletal representation in act 610. Due to the time delay between the recording of the neuromuscular signals and the performance of the actual movement, some embodiments are able to control a virtual or physical device with short latencies.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computerized system comprising:
a memory storing a musculo-skeletal representation of a user's body, wherein:
the musculo-skeletal representation of the user's body comprises:
information describing rigid body segments connected by joints; and
information describing a spatial relationship of the rigid body segments; and
each of the rigid body segments corresponds to one or more skeletal structures in the user's body;
neuromuscular sensors configured to continuously measure neuromuscular signals from the user's body; and
at least one computer processor programmed to continuously update the musculo-skeletal representation of the user's body in the memory to reflect, in real time, motions of the user's body by:
continuously providing, as input to a trained statistical model, information based on the neuromuscular signals;

continuously providing, as a constraint used by the trained statistical model, the continuously updated musculo-skeletal representation from the memory, wherein the information describing the rigid body segments connected by the joints and the information describing the spatial relationship of the rigid body segments are used by the trained statistical model to limit probabilities of possible spatial relationships of the rigid body segments;

continuously using the trained statistical model to determine, based on the continuously updated musculo-skeletal representation and the information based on the neuromuscular signals, a change to the spatial relationship of the rigid body segments matching a corresponding change to a spatial relationship of the skeletal structures in the user's body; and continuously updating, in the memory, the information describing the spatial relationship of the rigid body segments based, at least in part, on the change to the spatial relationship of the rigid body segments.

2. The computerized system of claim 1, further comprising at least one motion sensor configured to continuously measure motion signals, wherein:

the at least one computer processor is further programmed to provide, as additional input to the trained statistical model, information based on the motion signals; and the change to the spatial relationship of the rigid body segments is further determined based, at least in part, on the motion signals.

3. The computerized system of claim 2, wherein:

the at least one motion sensor is configured to continuously measure the motion signals at a first sampling rate;

the neuromuscular sensors are configured to continuously measure the neuromuscular signals at a second sampling rate;

the first sampling rate and the second sampling rate are different; and at least one of the motion signals or the neuromuscular signals are resampled such that the motion signals and the neuromuscular signals are provided as input to the trained statistical model at the same rate or the trained statistical model is configured to process asynchronous inputs.

4. The computerized system of claim 3, wherein the at least one motion sensor and the neuromuscular sensors are arranged on a same wearable device.

5. The computerized system of claim 1, wherein the neuromuscular sensors comprise electromyography (EMG) sensors, mechanomyography (MMG) sensors, sonomyography (SMG) sensors, or a combination of EMG, MMG and SMG sensors.

6. The computerized system of claim 1, wherein the information describing the rigid body segments connected by the joints comprises constraints derived from an anatomy or physics of one or more users.

7. The computerized system of claim 1, wherein:

the musculo-skeletal representation further comprises constraints derived from behaviors of one or more users; and information describing the constraints derived from the behaviors is used by the trained statistical model to limit the probabilities of the possible spatial relationships of the rigid body segments.

8. The computerized system of claim 1, wherein the at least one computer processor is further programmed to send, based at least in part on the continuously updated musculo-skeletal representation, one or more control signals to a controller configured to instruct a device to perform an action based on the one or more control signals.

9. The computerized system of claim 8, wherein:

the at least one computer processor is further programmed to execute a computer application that provides a virtual reality environment;

the controller comprises a display controller configured to instruct a display to display a visual representation of a character in the virtual reality environment; and the control signals comprise signals to instruct the display controller to update in real time the visual representation of the character based on the continuously updated musculo-skeletal representation.

10. The computerized system of claim 9, wherein:

the virtual reality environment comprises a virtual object; and updating the visual representation of the character comprises updating the visual representation such that the character interacts with the virtual object.

11. The computerized system of claim 10, wherein interacting with the virtual object comprises an action selected from the group consisting of grasping the virtual object, dropping the virtual object, pushing the virtual object, throwing the virtual object, pulling the virtual object, opening the virtual object, and closing the virtual object.

12. The computerized system of claim 8, wherein:

the controller includes a control interface; and the control signals comprise signals to instruct at least one component of the device to move based on the change to the spatial relationship of the rigid body segments.

13. The computerized system of claim 1, wherein the information describing the rigid body segments connected by the joints and the information describing the spatial relationship of the rigid body segments are kinematic constraints of the trained statistical model.

14. The computerized system of claim 1, wherein the change to the spatial relationship of the rigid body segments is constrained by types of the joints connecting the rigid body segments.

15. The computerized system of claim 1, further comprising a single wearable device configured to be worn on or around a body part of the user, wherein all of the neuromuscular sensors are arranged on the single wearable device.

16. The computerized system of claim 15, wherein the single wearable device comprises a flexible or elastic band configured to be worn around a body part of the user.

17. The computerized system of claim 16, wherein the flexible or elastic band comprises an armband configured to be worn around an arm of the user.

18. A method comprising:

storing, in memory, a musculo-skeletal representation of a user's body, wherein:

the musculo-skeletal representation of the user's body comprises:

information describing rigid body segments connected by joints; and information describing a spatial relationship of the rigid body segments; and each of the rigid body segments corresponds to one or more skeletal structures in the user's body;

continuously measuring, using one or more neuromuscular sensors, neuromuscular signals from the user's body; and continuously updating, in the memory, the musculo-skeletal representation of the user's body to reflect, in real time, motions of the user's body by:
  continuously providing, as input to a trained statistical model, information based on the neuromuscular signals;
  continuously providing, as a constraint used by the trained statistical model, the continuously updated musculo-skeletal representation from the memory, wherein the information describing the rigid body segments connected by the joints and the information describing the spatial relationship of the rigid body segments are used by the trained statistical model to limit probabilities of possible spatial relationships of the rigid body segments;
  continuously using the trained statistical model to determine, based on the continuously updated musculo-skeletal representation and the information based on the neuromuscular signals, a change to the spatial relationship of the rigid body segments matching a corresponding change to a spatial relationship of the skeletal structures in the user's body; and
  continuously updating, in the memory, the information describing the spatial relationship of the rigid body segments based, at least in part, on the change to the spatial relationship of the rigid body segments.

19. A computer system comprising:
an input interface configured to:
receive, from one or more neuromuscular sensors, neuromuscular signals measured from a user's body during performance of a task; and
receive position information indicating a spatial relationship of skeletal structures in the body of the user during performance of the task; and
at least one storage device configured to store:
a musculo-skeletal representation of the user's body, wherein:
the musculo-skeletal representation of the user's body comprises:
information describing rigid body segments connected by joints; and
information describing a spatial relationship of the rigid body segments; and
each of the rigid body segments corresponds to one or more of the skeletal structures in the user's body; and
instructions that, when executed by at least one computer processor perform a method of:
generating training data based, at least on part, on the received neuromuscular signals and the received position information;
training, using at least some of the generated training data, a statistical model to:
take additional neuromuscular signals and the musculo-skeletal representation of the user's body as input;
use the information describing the rigid body segments connected by the joints and the information describing the spatial relationship of the rigid body segments to limit probabilities of possible spatial relationships of the rigid body segments; and
output a change to the spatial relationship of the rigid body segments matching a corresponding change to the spatial relationship of the skeletal structures in the user's body; and
storing, by the at least one storage device, the trained statistical model.

20. The computer system of claim 19, wherein the position information is received from at least one sensor other than the neuromuscular sensors.

* * * * *